No. 793,190. PATENTED JUNE 27, 1905.
W. T. HAMBROOK.
ANIMAL TRAP.
APPLICATION FILED SEPT. 6, 1904.

WITNESSES:
INVENTOR.
Wm T. Hambrook
BY
Ridout and Maybee
ATTORNEYS.

No. 793,190.  Patented June 27, 1905.

UNITED STATES PATENT OFFICE.

WILLIAM T. HAMBROOK, OF TORONTO, CANADA.

ANIMAL-TRAP.

SPECIFICATION forming part of Letters Patent No. 793,190, dated June 27, 1905.

Application filed September 6, 1904. Serial No. 223,505.

*To all whom it may concern:*

Be it known that I, WILLIAM T. HAMBROOK, bookkeeper, of the city of Toronto, in the Province of Ontario, Canada, have invented certain new and useful Improvements in Animal-Traps, of which the following is a specification.

The object of my invention is to devise a simple and effective rat-trap by means of which a number of animals may be caught with the same bait; and it consists, essentially, of a cage having two compartments communicating with one another by a small door, one chamber being open at its outer end and provided with a tilting platform adapted when tilted inwardly to close the opening of the outer compartment and to open the door between the compartments. This platform is shaped to form an outer inclined ladder, a central horizontal portion provided with a bait-receptacle, and an upwardly-inclined portion at the inner end adapted when the platform is tilted to assume a horizontal position adjacent to the door, substantially as hereinafter described.

Figure 1:
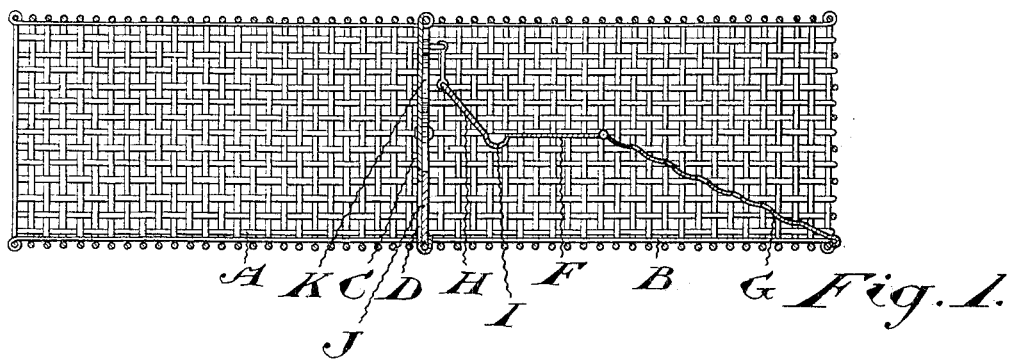
Figure 3:
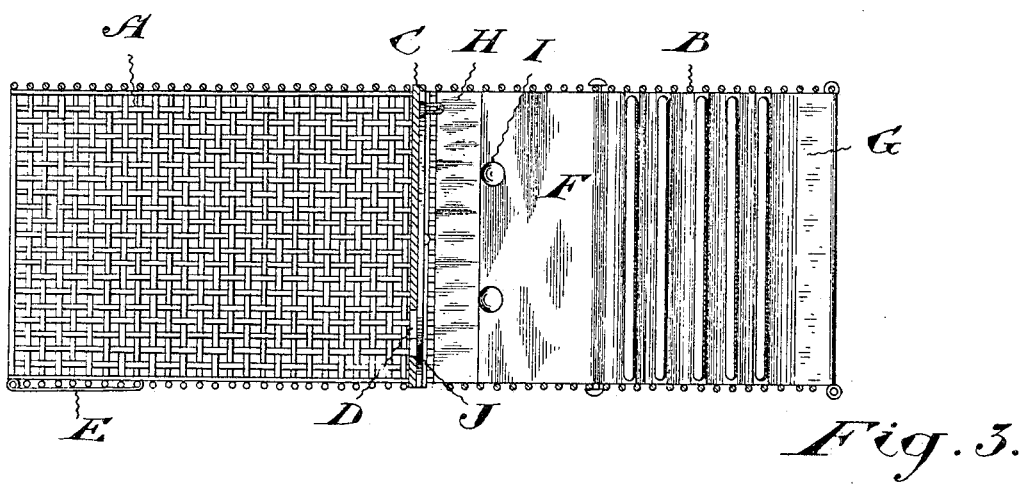
Figure 4:
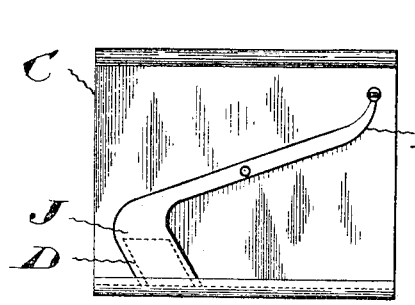
Figure 2:
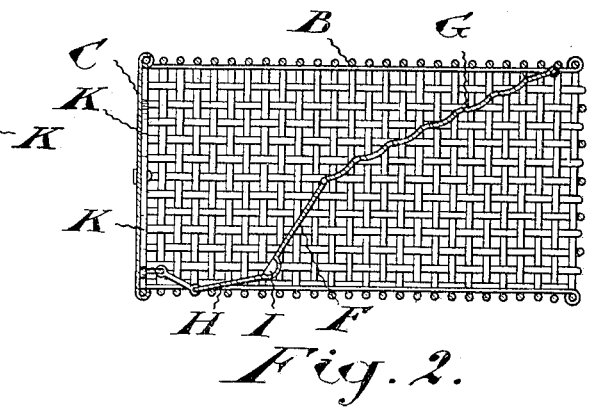

Figure 1 is a side sectional elevation of my improved trap with the parts in their normal position. Fig. 2 is a similar view of part of the trap, showing the parts as they appear as tilted by the weight of an animal. Fig. 3 is a plan view of the operative parts of the trap. Fig. 4 is a front elevation showing the door forming a communication between the compartments of the trap.

In the drawings like letters of reference indicate corresponding parts in the different figures.

It will be seen that the trap comprises a cage divided into two compartments A and B by a partition C. In this partition is formed an aperture D of sufficient size for the passage of the animal the trap is designed for. The compartment A is provided with any suitable door, such as E, through which captured animals may be removed. The compartment B is open at its outer end and has journaled within it the tilting platform. This platform comprises the horizontal center portion F, the outer inclined portion G normally sloping down to the bottom and the inner portion H normally extending upward.

The parts, it will be seen, are so proportioned that when the platform is tilted sufficiently the ends of the platform close the outer compartment of the trap, while the inner portion H of the platform assumes a substantially horizontal position.

The outer portion G, it will be seen, is formed as a ladder. There is, however, sufficient weight of material left in it to cause the parts to maintain their normal position.

Formed in the horizontal portion F of the platform, or, if necessary, in the part H are one or more depressions I, intended to serve as bait-receptacles. These will be filled with some substance attractive to the animals for which the trap is designed.

J is a door adapted to close the aperture D. This door is connected to one end of the arm K, which is centrally pivoted, thus making it a lever of the first order. The outer end of this lever is connected by a link or other flexible connection with the adjacent part of the tilting platform. From this construction it follows that when the platform is in its normal position the door is closed and when the platform is tilted, as shown in Fig. 2, the door is open.

The operation of the device is substantially as follows: An animal attracted by the bait climbs the outer ladder-like portion of the tilting platform and advances over the horizontal portion to the bait. His weight then tilts the platform until the inner part assumes a substantially horizontal position. This movement of the platform has opened the door, and the animal, seeing all exits barred save that through the aperture D, naturally goes through into the compartment A. As soon as the weight is off the part H of the tilting platform the latter assumes its normal position and the door J is once more closed. The trap, it will be thus seen, without rebaiting is adapted to capture as many animals as can find accommodation within it, and, when necessary, they may be removed through the door E and destroyed.

While the trap is primarily intended for rats, yet by mere changes in size or detail it may be adapted to mice or other small animals.

While I show the details of construction and proportion of the parts which I deem preferable, yet it will be understood that I do not wish to confine myself to these exact details, as various changes may be made without departing from the spirit of my invention.

What I claim as my invention is—

1. In an animal-trap a cage divided into two compartments communicating by a suitable aperture, the outer compartment being open at its outer end, in combination with a tilting platform horizontally journaled in the outer compartment and comprising a center portion normally substantially horizontal; an outer portion normally sloping down to the bottom, and an inner portion normally extending upward, the parts being so proportioned that the weight of an animal on the horizontal portion will cause the ends of the platform to close the trap while the inner portion assumes a substantially horizontal position; and means permitting an animal to enter the inner compartment while the platform is in its tilted position, substantially as described.

2. In an animal-trap a cage divided into two compartments communicating by a suitable aperture, the outer compartment being open at its outer end; in combination with a tilting platform horizontally journaled in the outer compartment and comprising a center portion normally substantially horizontal and having a bait-receptacle formed therein, an outer portion normally sloping down to the bottom, and an inner portion normally extending upward, the parts being so proportioned that the weight of an animal on the horizontal portion will cause the ends of the platform to close the trap while the inner portion assumes a substantially horizontal position; and means permitting an animal to enter the inner compartment while the platform is in its tilted position, substantially as described.

3. In an animal-trap a cage divided into two compartments communicating by a suitable aperture, the outer compartment being open at its outer end; in combination with a tilting platform horizontally journaled in the outer compartment and comprising a center portion normally substantially horizontal, an outer portion normally sloping down to the bottom, and an inner portion normally extending upward, the parts being so proportioned that the weight of an animal on the horizontal portion will cause the ends of the platform to close the trap while the inner portion assumes a substantially horizontal position; a lever of the first order carrying at one end a door adapted to close the aperture between the compartments of the cage; and a flexible connection between the other end of the lever and the platform, substantially as described.

Toronto, August 29, 1904.

WM. T. HAMBROOK.

In presence of—
J. EDW. MAYBEE,
P. R. JONES.